(12) United States Patent
Tsai et al.

(10) Patent No.: US 8,076,816 B2
(45) Date of Patent: Dec. 13, 2011

(54) STATOR AND COOLING FAN HAVING THE SAME

(75) Inventors: Kuan-Teng Tsai, Taipei Hsien (TW); Jr-Shiun Chen, Taipei Hsien (TW)

(73) Assignee: Foxconn Technology Co., Ltd., Tu-Cheng, New Taipei (TW)

( * ) Notice: Subject to any disclaimer, the term of this patent is extended or adjusted under 35 U.S.C. 154(b) by 310 days.

(21) Appl. No.: 12/486,730

(22) Filed: Jun. 17, 2009

(65) Prior Publication Data

US 2010/0104455 A1 Apr. 29, 2010

(30) Foreign Application Priority Data

Oct. 28, 2008 (CN) .......................... 2008 1 0305249

(51) Int. Cl.
*H02K 7/00* (2006.01)
(52) U.S. Cl. .................. 310/194; 310/215; 310/67 R
(58) Field of Classification Search .................. 310/194, 310/215, 67 R
See application file for complete search history.

(56) References Cited

U.S. PATENT DOCUMENTS

| 6,654,213 | B2 * | 11/2003 | Horng et al. | 361/23 |
| 6,670,736 | B2 * | 12/2003 | Horng et al. | 310/194 |
| 2006/0012261 | A1 * | 1/2006 | Ku et al. | 310/215 |

* cited by examiner

*Primary Examiner* — Quyen Leung
*Assistant Examiner* — Leda Pham
(74) *Attorney, Agent, or Firm* — Altis Law Group, Inc.

(57) ABSTRACT

A cooling fan includes a fan housing, a stator mounted in the fan housing and a rotor rotatablely supported by the stator. The stator includes a stator core, an insulating frame attached to the stator core and stator coils wound on the insulating frame and around the stator core. The insulating frame electrically insulates the stator coils from the stator core. The stator core includes a main body and a plurality of claws. Every two neighboring claws define a receiving room therein. The insulating frame includes a bottom portion located at a bottom of the stator core and a plurality of flanges extending upwardly from the bottom portion into the receiving rooms of the stator core, respectively. A height of the flanges is no less than that of the stator core.

18 Claims, 6 Drawing Sheets

STATOR AND COOLING FAN HAVING THE SAME

BACKGROUND

1. Technical Field

The present disclosure relates to cooling fans, and particularly to a stator of a cooling fan.

2. Description of Related Art

With continuing development of electronic technology, heat-generating electric components such as CPUs (central processing units) are generating more and more heat which requires immediate dissipation. Cooling fans are commonly used in combination with heat sinks for cooling the CPUs.

A typical cooling fan includes a stator and a rotor rotatably supported by the stator. The rotor includes a hub and a plurality of blades extending radially and outwardly therefrom. The stator includes stator coils, a stator core having a plurality of slots for receiving the stator coils, and upper and lower insulating frames for insulating the stator core and the stator coils. When assembled, the upper and lower insulating frames attach to top and bottom sides of the stator core respectively, which result in inconveniency of assembling the stator. On another aspect, the upper and lower insulating frames both have a certain thickness, which increases a thickness of the stator and thus deviates from a compact requirement for the cooling fan.

Therefore, a cooling fan having an improved stator is desired to overcome the above describe shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present cooling fan. Moreover, in the drawings, like reference numerals designate corresponding parts throughout the several views.

DETAILED DESCRIPTION

Figure 1:
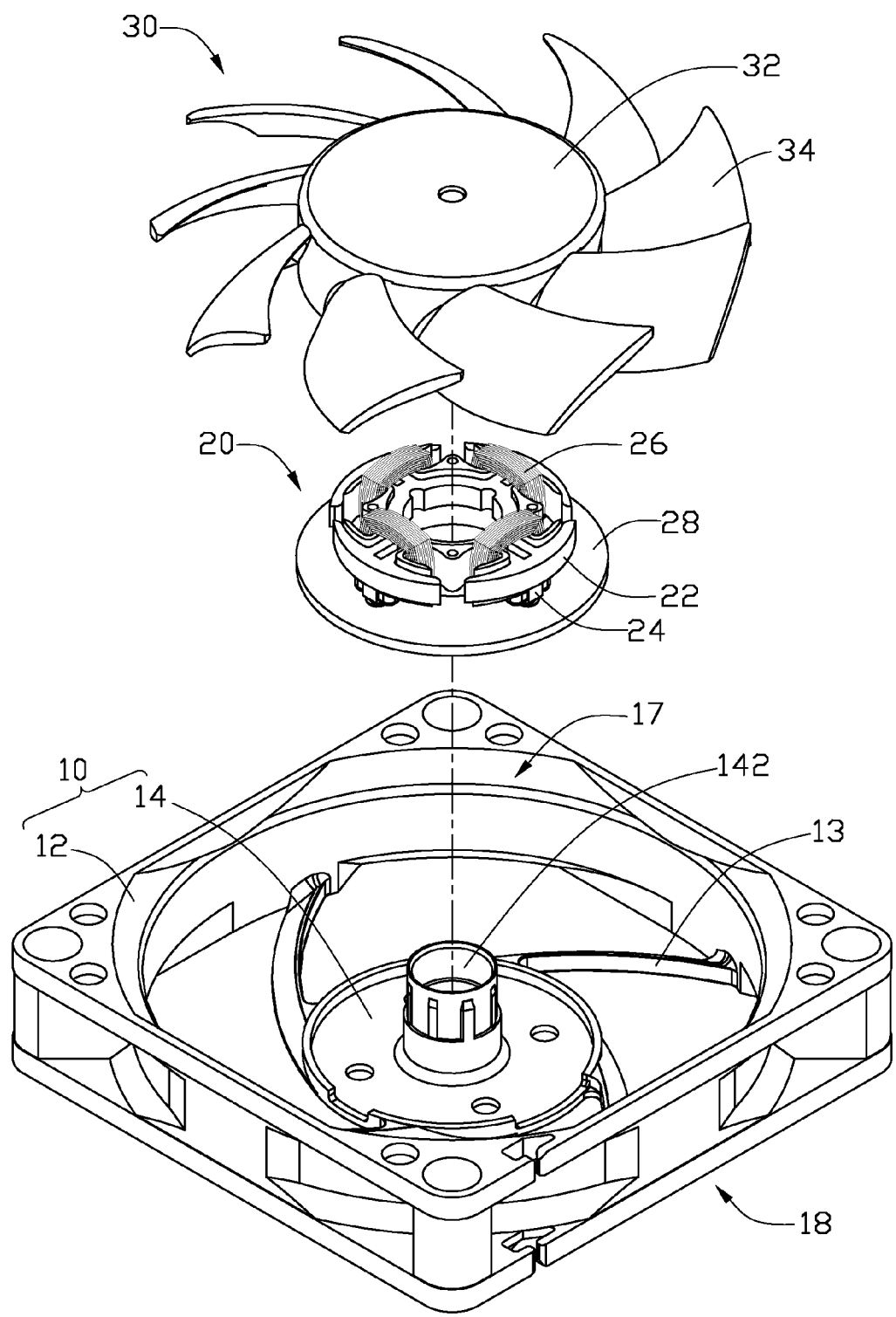
FIG. 1 is an exploded, isometric view of a cooling fan in accordance with an exemplary embodiment.

FIG. 1 shows a cooling fan in accordance with an exemplary embodiment of the disclosure. The cooling fan includes a fan housing 10, a stator 20 and a rotor 30 received in the fan housing 10. The fan housing 10 includes a square-shaped hollow casing 12 and a base 14 arranged at a central portion of the casing 12. The fan housing 10 defines an air inlet 17 at a top side and an opposite air outlet 18 at a bottom side thereof. The base 14 is located at a central portion of the air outlet 18. A plurality of ribs 13 connect the base 14 to the casing 12. A central tube 142 extends upwardly from a central portion of the base 14 towards the air inlet 17 for mounting the stator 20 thereon.

The rotor 30 includes a cylindrical hub 32 and a plurality of blades 34 extending radially and outwardly from an outer circumference surface of the hub 32.

The stator 20 includes a PCB 28 (printed circuit board), a stator core 22, a plurality of stator coils 26 and an insulating frame 24. The stator core 22 is arranged at a top side of the PCB 28. The stator coils 26 are wound on the stator core 22. The PCB 28 with electronic components mounted thereon is electrically connected with the stator coils 26 to control electrical current flowing through the stator coils 26. The insulating frame 24 is attached to the stator core 22. The coils 26 are wound on the insulating frame 24 and around the stator core 22, whereby a direct contact between the coils 26 and the stator core 22 is avoided by the insulating frame 24. The insulating frame 24 electrically insulates the coils 26 from the stator core 22.

Figure 2:
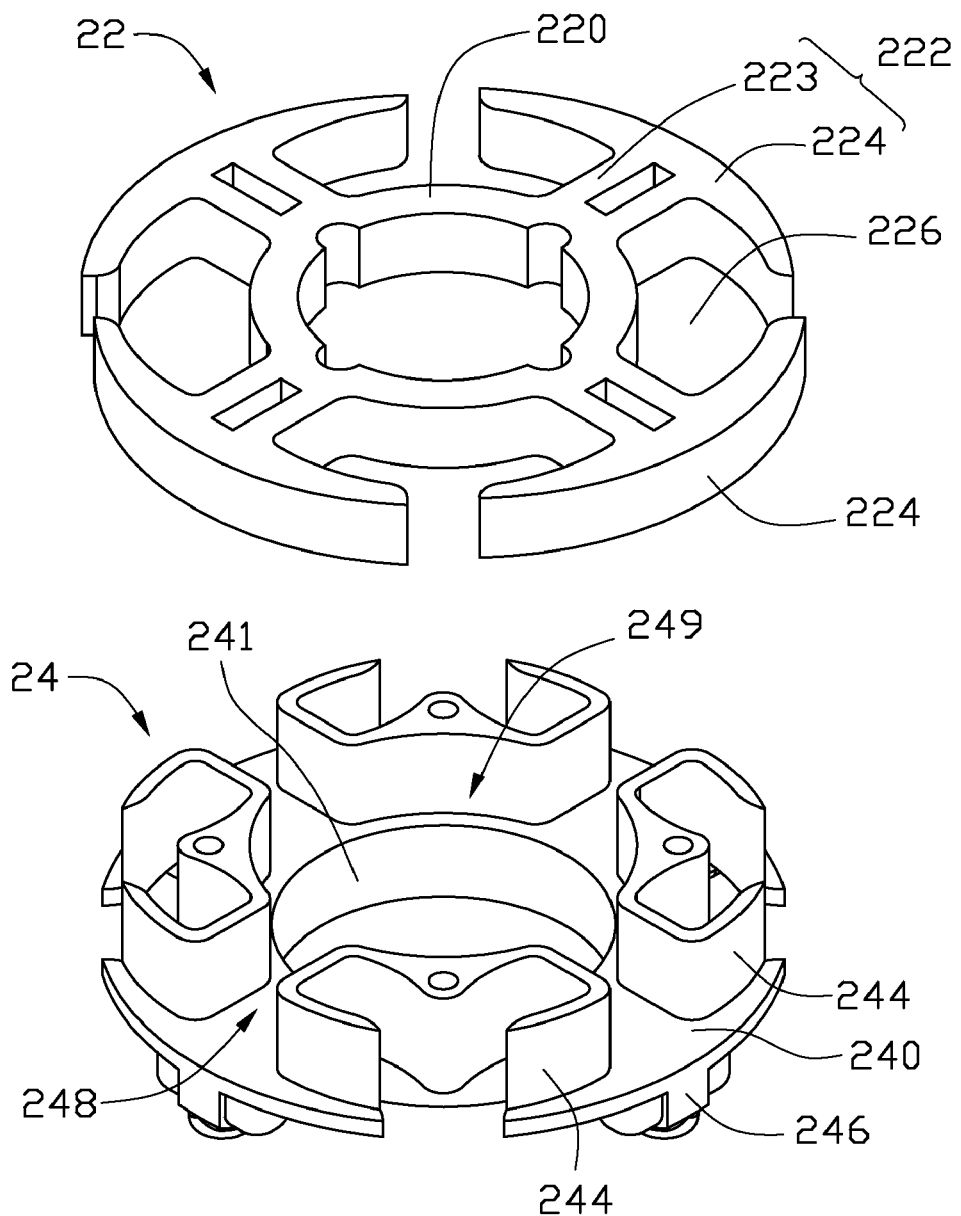
FIG. 2 is an exploded, isometric view of a stator of the cooling fan of FIG. 1, with a circuit board and coils being removed.
Figure 3:
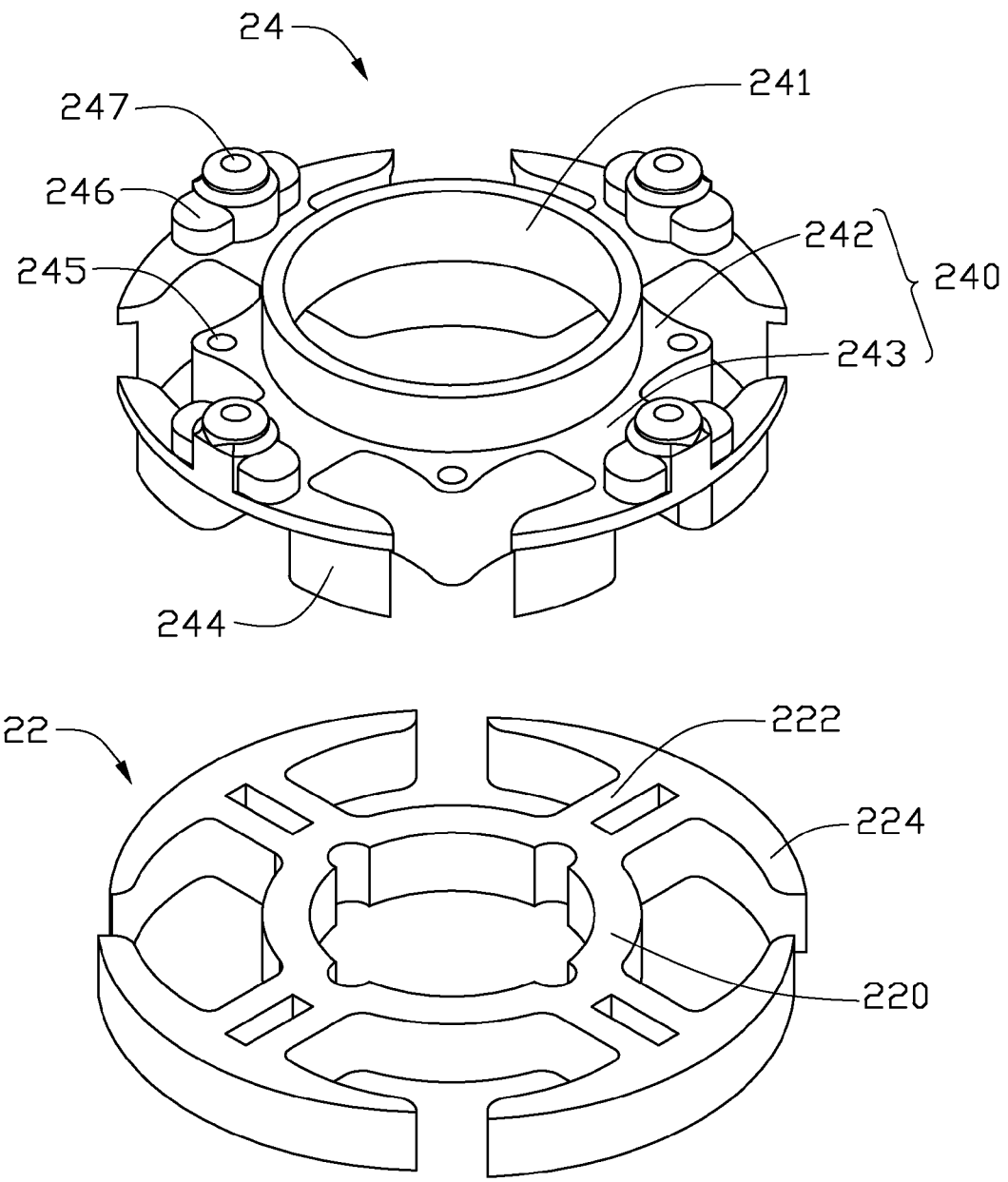
FIG. 3 is similar to FIG. 2, but viewed from another aspect.

Referring to FIGS. 2 and 3, the stator core 22 includes an annular main body 220 and a plurality of claws 222 extending radially and outwardly from an outer periphery of the main body 220. Each claw 222 is generally T-shaped, and includes a linear wrapping post 223 connected with the main body 220 and an arced wing 224 formed at a free end of the wrapping post 223. The claws 222 are evenly disposed along a circumferential direction of the main body 220. The wings 224 are spaced from each other, and evenly arranged on an imaginary circle around the main body 220. The free end of the wrapping post 223 of each claw 222 connects a middle of a corresponding wing 224. A receiving room 226 is defined among each two neighboring claws 222 and the main body 220. More specifically, the receiving room 226 is defined among two near halves of two wings 224 of the two neighboring claws 222, two wrapping posts 223 of the two neighboring claws 222 and a portion of the main body 220 between the two wrapping posts 223 of the two neighboring claws 222.

The insulating frame 24 includes an annular bottom portion 240, and a plurality of flanges 244 extending upwardly and perpendicularly from the bottom portion 240. The bottom portion 240 includes a square-shaped protecting plate 242 defining a central hole at a central portion thereof and a plurality of protecting arms 243 horizontally and outwardly extending from middle portions of four sides of the protecting plate 242, respectively. A cylindrical wall 241 which defines a through hole therein extends downwardly and perpendicularly from an inner portion of the protecting plate 242. Each of the protecting arms 243 is generally T-shaped, and has a shape and size corresponding to the claw 222 of the stator core 22. Each corner of the protecting plate 242 defines a first positioning hole 245 therein. A pin seat 246 extends downwardly and perpendicularly from an outer end of each protecting arm 243 that is away from the cylindrical wall 241. Each pin seat 246 defines a second positioning hole 247 therein.

The flanges 244 are evenly arranged on a top surface of the bottom portion 240 along a circumferential direction thereof. A height of the flanges 244 is larger than a height of the stator core. Each of the flanges 244 has an outline corresponding to a profile of the receiving room 226 of the stator core 22. The flanges 244 cooperatively define a central space 249 therebetween for receiving the main body 220 of the stator core 22. A receiving groove 248 is defined between two neighboring flanges 244. Each of the claws 222 of the stator core 22 has an outline corresponding to a profile of the receiving groove 248 of the insulating frame 24.

Figure 4:
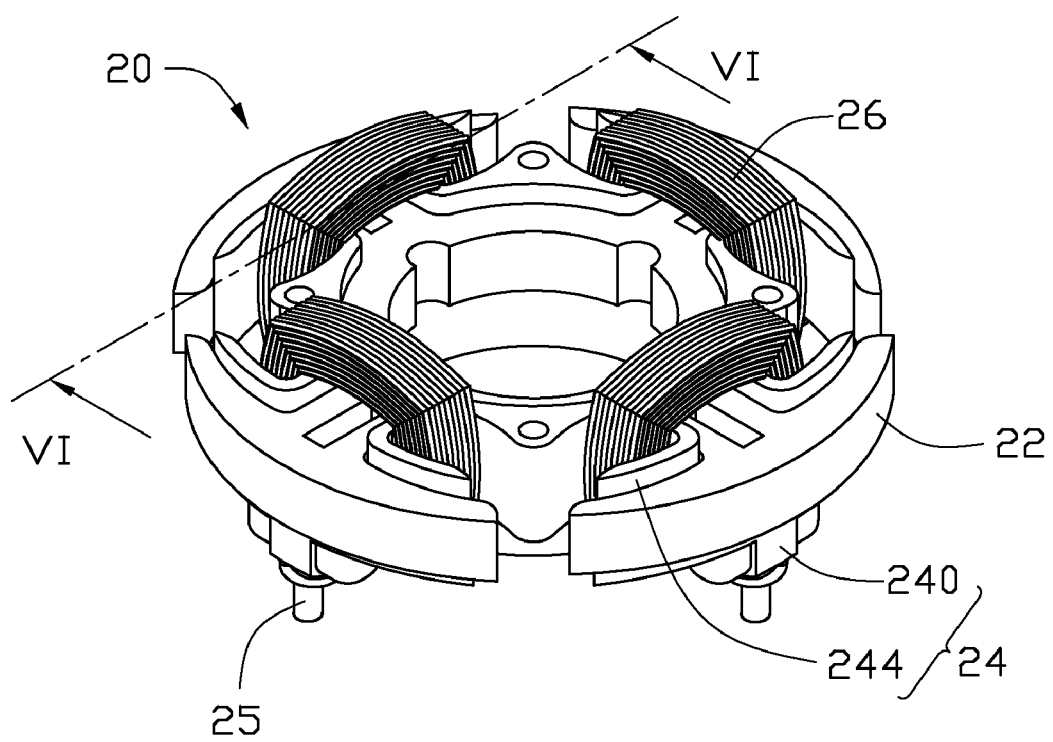
FIG. 4 is an enlarged view of the stator of FIG. 1, with the printed circuit board removed.
Figure 5:
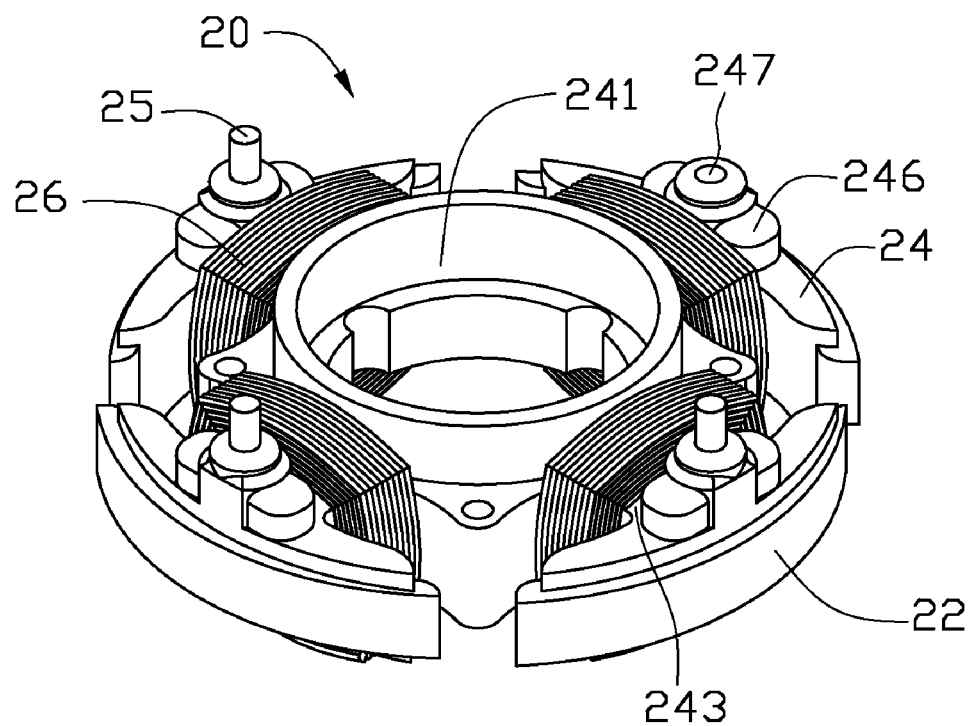
FIG. 5 is similar to FIG. 4, but viewed from another aspect.
Figure 6:
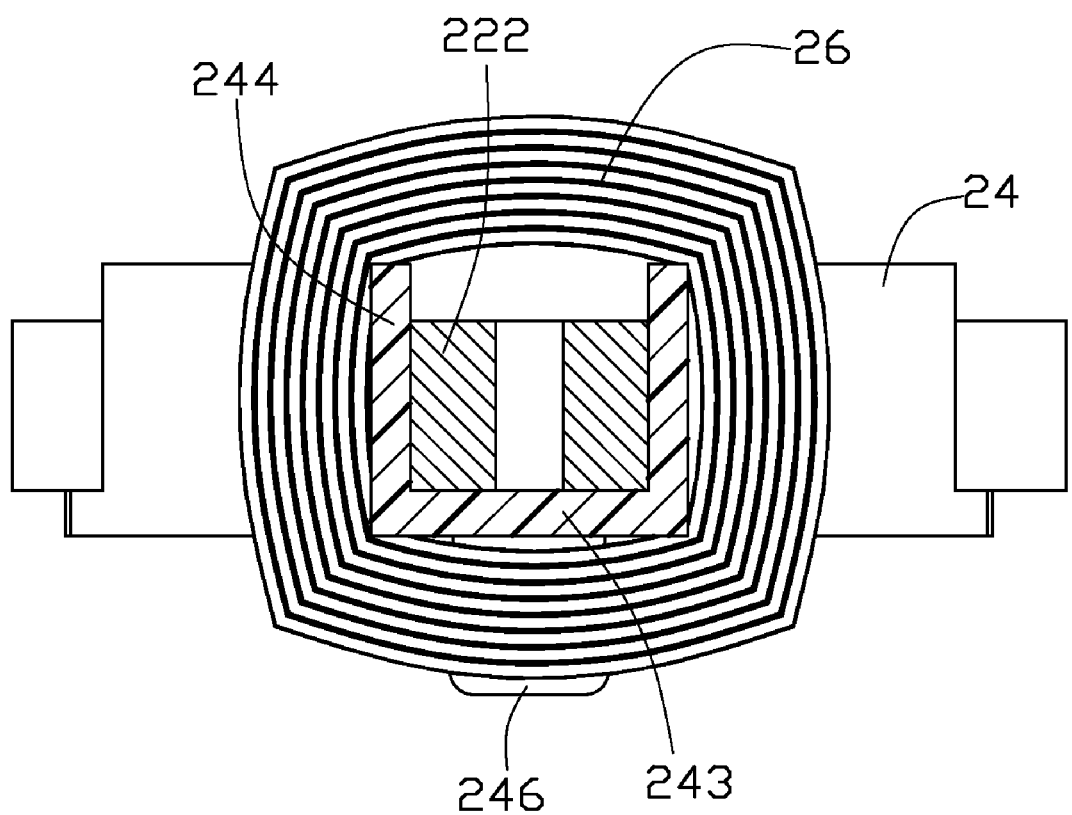
FIG. 6 is a cross-sectional view of the stator of FIG. 4, taken along a line VI-VI thereof.

Referring to FIGS. 4-6, when the stator 20 is assembled, the main body 220 of the stator core 22 engages into the central space 249 and abuts the top surface of the protecting plate 242 of the insulating frame 24. The claws 222 are engaged into the receiving grooves 248 between the neighboring flanges 244 of the insulating frame 24, respectively. The flanges 244 of the insulating frame 24 are received in the receiving rooms 226 of the stator core 22, respectively. Since the height of the flanges 244 of the insulating frame 24 is higher than that of the wrapping posts 223 of the stator core 22, the flanges 244 of the insulating frame 24 inserted in the receiving rooms 226 are higher than the wrapping posts 223, whereby the flanges 244 can fully cover an inner side surface of the stator core 22 surrounding the receiving rooms 226. In addition, a top face of the bottom portion 240 of the insulating frame 24 substantially fully covers a bottom surface of the stator core 22. When the coils 26 are wound around the wrapping posts 223 of the claws 222 of the stator core 22, the coils 26 are wound onto two facing parts of two neighboring flanges 244 at two sides of each wrapping post 223 and a corresponding protecting arm 243 between the two neighboring flanges 244, whereby the insulating frame 24 can isolate the stator core 22 from the coils 26. Thus, the coils 26 are spaced and electrically insulated from the claws 222 of the stator core 22 by the flanges 244 of the insulating frame 24. The cylindrical wall 241 and the pin seats 246 are located at two sides of the coils 26, respectively, and can prevent the coils 26 from separation from the stator 20.

Alternatively, the height of the flanges 244 of the insulating frame 24 can be equal to that of the stator core 22. Since the coils 26 wound on the flanges 244 of the insulating frame 24 expands outwardly due to a tension thereof, a clearance is formed between each of the stator coils and the flanges 244, and the coils 26 can also be completely electrically insulated from the stator core 22 by the insulating frame 24. Thus, the stator having such an insulating frame 24 with a reduced height is thinner than the stator 20 of the previous embodiment.

The PCB 28 is located under the insulating frame 24, and electrically connected with the coils 26. The PCB 28 connects to the insulating frame 24 via a plurality of pins 25 respectively traversing through the positioning holes 245, 247 of the insulating frame 24 and to the PCB 28. In this embodiment, three pins 25 are provided; one end of each pin 25 is received in the second positioning hole 247 of a corresponding pin seat 246 of the insulating frame 24, and the other end of each pin 25 is connected to the PCB 28. As the insulating frame 24 defines the first positioning holes 245 at the corners of the protecting plate 242 and the second positioning holes 247 in the pin seats thereof, a distance between each two neighboring positioning holes is smaller, so that the three pins 25 can be alternatively set in two neighboring second positioning holes 247 and the first positioning hole 245 between the two neighboring second positioning holes 247 to fit a PCB with a smaller size. Thus, the insulating frame 24 of the present disclosure can have a better compatibility with different PCBs of different sizes.

When the cooling fan is assembled, the stator 20 is mounted around the central tube 142 of the base 14. The rotor 30 is rotatablely supported by the stator 20. During operation, the blades 34 of the rotor 30 rotate to drive air from the air inlet 17 to the air outlet 18 and thus an airflow is formed.

In the present disclosure, the stator 20 of the cooling fan only use one insulating frame 24 which completely insulates the stator coils 26 from the stator core 22, such that a structure of the stator 20 is simpler and a size of the stator 20 is thinner, in comparison with the conventional stator which has upper and lower insulating frames.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stator for a cooling fan, comprising:
a stator core comprising a main body and a plurality of claws extending radially and outwardly from the main body, every two neighboring claws defining a receiving room therebetween;
an insulating frame comprising a bottom portion being located at a bottom side of the stator core and a plurality of flanges with a height not less than that of the stator core extending upwardly from the bottom portion into the receiving rooms of the stator core, respectively, the bottom portion comprising a protecting plate and a plurality of protecting arms, a plurality of first positioning holes being defined in the protecting plate, the protecting arms corresponding to the claws of the stator core and extending outwardly from a periphery of the protecting plate, a plurality of second positioning holes being respectively defined in the protecting arms, and the first and second positioning holes allowing pins to extend therethrough to engage with a printed circuit board; and
a plurality of coils being wound on the flanges of the insulating frame and around the claws of the stator core and being spaced and electrically insulated from the claws of the stator core by the insulating frame.

2. The stator of claim 1, wherein the protecting plate defines a central hole at a center portion thereof.

3. The stator of claim 1, wherein the protecting plate is square-shaped.

4. The stator of claim 2, wherein each corner of the protecting plate defines one of the first positioning holes therein.

5. The stator of claim 1, wherein a pin seat extends downwardly from an end of each protecting arm, and each pin seat defines one of the second positioning holes therein.

6. The stator of claim 1, wherein the protecting arms of the insulating frame each are substantially T-shaped.

7. The stator of claim 1, wherein every two neighboring flanges of the insulating frame define a receiving groove therebetween for receiving a corresponding claw of the stator core.

8. The stator of claim 1, wherein the height of the flanges of the insulating frame is greater than that of the stator core.

9. The stator of claim 1, wherein the height of the flanges of the insulating frame is equal to that of the stator core.

10. A cooling fan, comprising:
a fan housing forming a base at a central portion therein;
a stator being mounted on the base, the stator comprising:
a stator core comprising a main body and a plurality of claws extending radially and outwardly from the main body, every two neighboring claws defining a receiving room therebetween;
an insulating frame comprising a bottom portion being located at a bottom side of the stator core and a plurality of flanges extending upwardly from the bottom portion into the receiving rooms of the stator core, respectively, a top side of each of the flanges being not lower than a top side of the stator core, the bottom portion comprising a protecting plate and a plurality of protecting arms, a plurality of first positioning holes being defined in the protecting plate, the protecting arms corresponding to the claws of the stator core and extending outwardly from a periphery of the protecting plate, and a plurality of second positioning holes being respectively defined in the protecting arms;

a printed circuit board located under the insulating frame;

three pins, the pins selectively extended through one of the first and two of the second positioning holes and engaged with the printed circuit board to fix the insulating frame on the printed circuit board; and a plurality of coils being wound on the insulating frame and around the claws of the stator core and being spaced and electrically insulated from the claws of the stator core by the insulating frame; and a rotor being rotatably supported by the stator.

11. The cooling fan of claim 10, wherein the protecting plate defines a central hole at a center portion thereof.

12. The cooling fan of claim 10, wherein the protecting plate is square-shaped.

13. The cooling fan of claim 11, wherein each corner of the protecting plate defines one of the first positioning holes therein.

14. The cooling fan of claim 10, wherein a pin seat extends downwardly from an end of each protecting arm, and each pin seat defines one of the second positioning holes therein.

15. The cooling fan of claim 10, wherein the protecting arms of the insulating frame each are substantially T-shaped.

16. The cooling fan of claim 10, wherein every two neighboring flanges of the insulating frame define a receiving groove therebetween for receiving a corresponding claw of the stator core.

17. The cooling fan of claim 10, wherein a height of the flanges of the insulating frame is greater than that of the stator core.

18. The cooling fan of claim 10, wherein a height of the flanges of the insulating frame is equal to that of the stator core.

* * * * *